United States Patent
Hosseini et al.

(10) Patent No.: US 12,456,873 B2
(45) Date of Patent: Oct. 28, 2025

(54) METHOD AND APPARATUS FOR CONTROLLING A DC-DC POWER CONVERTER

(71) Applicant: GM GLOBAL TECHNOLOGY OPERATIONS LLC, Detroit, MI (US)

(72) Inventors: Rasoul Hosseini, Troy, MI (US); Ranjay Singh, Karnataka (IN)

(73) Assignee: GM Global Technology Operations LLC, Detroit, MI (US)

(*) Notice: Subject to any disclaimer, the term of this patent is extended or adjusted under 35 U.S.C. 154(b) by 758 days.

(21) Appl. No.: 17/859,161

(22) Filed: Jul. 7, 2022

(65) Prior Publication Data

US 2024/0014670 A1 Jan. 11, 2024

(51) Int. Cl.
| | |
|---|---|
| H02J 7/00 | (2006.01) |
| B60L 53/22 | (2019.01) |
| B60L 53/62 | (2019.01) |
| H02M 1/00 | (2006.01) |
| H02M 1/32 | (2007.01) |
| H02M 3/158 | (2006.01) |

(52) U.S. Cl.
CPC ............ *H02J 7/0029* (2013.01); *B60L 53/22* (2019.02); *B60L 53/62* (2019.02); *H02M 1/0009* (2021.05); *H02M 1/32* (2013.01); *H02M 3/1586* (2021.05); *B60L 2210/14* (2013.01); *H02J 2207/20* (2020.01)

(58) Field of Classification Search
None
See application file for complete search history.

(56) References Cited

U.S. PATENT DOCUMENTS

| | | | | |
|---|---|---|---|---|
| 5,986,354 A | * | 11/1999 | Nagao | H02J 7/35 307/64 |
| 2020/0358359 A1 | * | 11/2020 | Gagas | H02M 1/08 |

* cited by examiner

*Primary Examiner* — Robert Grant
(74) *Attorney, Agent, or Firm* — Quinn IP Law

(57) ABSTRACT

A self-activating fault protection circuit for an electrical charging system for an on-vehicle rechargeable energy storage device that includes a DC-DC boost converter is described. The self-activating fault protection circuit includes, in one embodiment, an electrical connector including a positive cable and a negative cable, high-voltage electric power bus, and a self-activating fault protection circuit including a high-voltage diode. The DC-DC boost converter is electrically connected to the rechargeable energy storage device via the high-voltage electric power bus, and the electrical connector is electrically connected to the DC-DC boost converter via the positive cable and the negative cable. The high-voltage diode is arranged in the negative cable between the electrical connector and the DC-DC boost converter.

20 Claims, 1 Drawing Sheet

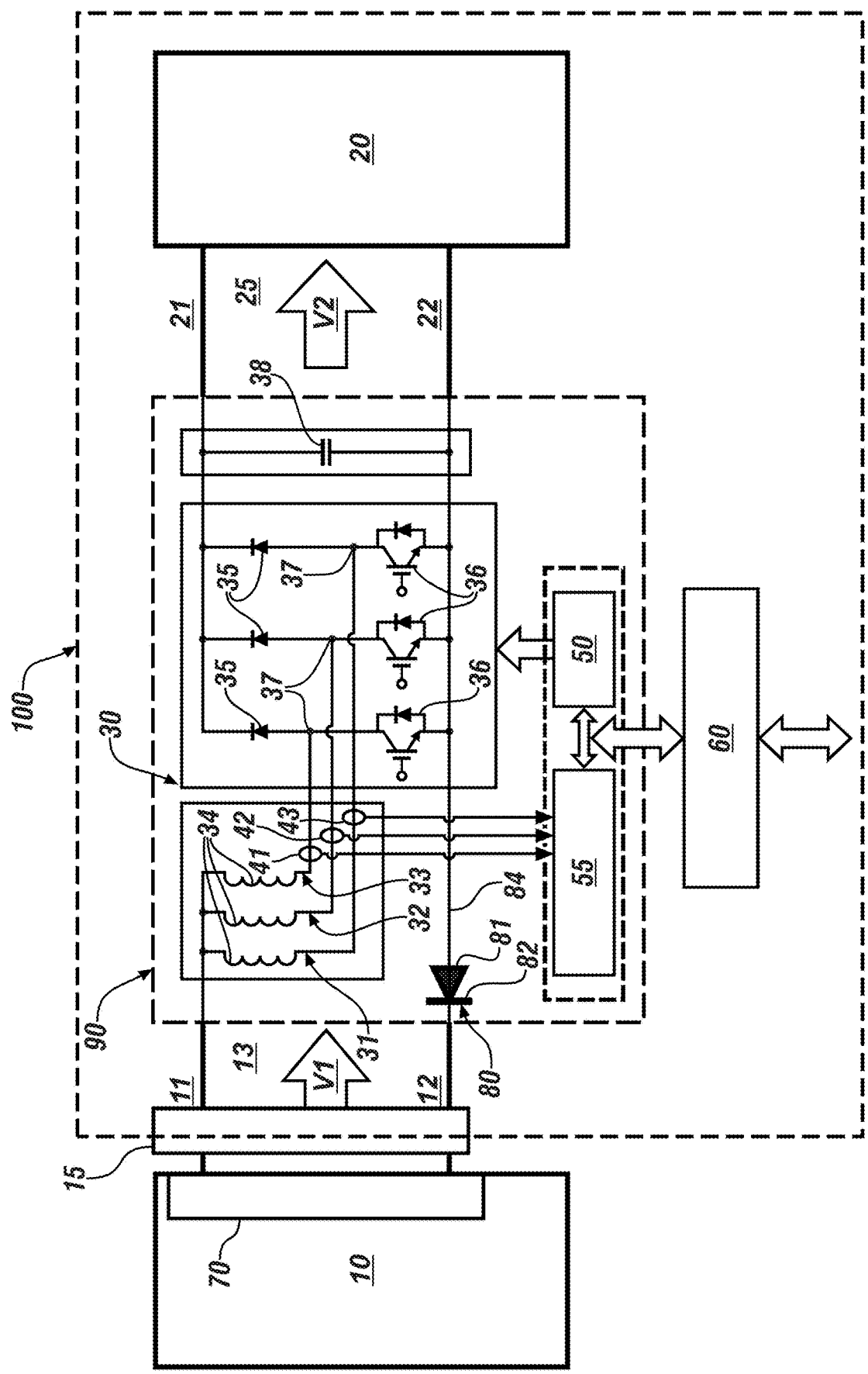

METHOD AND APPARATUS FOR CONTROLLING A DC-DC POWER CONVERTER

INTRODUCTION

Electrical energy storage devices on electrified vehicles and other devices are periodically charged using electric power originating from an off-board electric power supply or source.

There is a desire to rapidly charge an electrical energy storage device to reduce vehicle downtime and improve vehicle availability, thus improving customer satisfaction. Rapid charging may be accomplished by increasing the voltage and/or current of the electric charging power from the off-board electric power supply or source, employing a DC fast charger.

A fault in a DC fast charger may cause loss of electrical isolation, which may damage components and systems related to the DC fast charger. Known DC fast chargers may include an isolation fault circuit protection system, which may interrupt energy delivery to the electrified vehicle by breaking the connection between the DC fast charger and the electric vehicle circuitry in response to a detected fault. However, if the voltage of the electrical energy storage device is higher than a threshold voltage of a Surge Protective Device (SPD) of the DC fast charger, a fault in the SPD may occur, which may provide a path for short circuit current through a negative connection of the DC-DC converter. As a result, a Protective Earth (PE) connection between the on-vehicle electrical energy storage device and a DC fast charger may be damaged, potentially leading to a fault current and other risks.

SUMMARY

Accordingly, the concepts described herein provide a system and associated method for mitigating and isolating a fault in a DC charging circuit of an electrified vehicle during a charging event. An aspect of the disclosure may include a self-activating fault protection circuit for an electrical charging system for an on-vehicle rechargeable energy storage device that includes a DC-DC boost converter. The self-activating fault protection circuit may include, in one embodiment, an electrical connector including a positive cable and a negative cable, high-voltage electric power bus, and a self-activating fault protection circuit including a high-voltage diode. The DC-DC boost converter is electrically connected to the rechargeable energy storage device via the high-voltage electric power bus, and the electrical connector is electrically connected to the DC-DC boost converter via the positive cable and the negative cable. The high-voltage diode is arranged in the negative cable between the electrical connector and the DC-DC boost converter.

Another aspect of the disclosure may include the diode having a cathode and an anode, wherein the anode is proximal to the DC-DC boost converter, and wherein the cathode is proximal to the electrical connector.

Another aspect of the disclosure may include the DC-DC boost converter being a plurality of switched inductance circuits arranged in parallel, a plurality of current sensors disposed to monitor one of the switched inductance circuits, and a controller, in communication with the current sensors and operatively connected to the switched inductance circuits.

Another aspect of the disclosure may include the DC-DC boost converter being a fixed-frequency DC-DC boost converter.

Another aspect of the disclosure may include the DC-DC boost converter being a multi-phase interleaved DC-DC boost converter configured to increase a voltage level of electric power supplied from a DC power source that is connected via high-voltage bus.

Another aspect of the disclosure may include the multi-phase interleaved DC-DC boost converter being a plurality of switched inductance circuits.

Another aspect of the disclosure may include the DC-DC boost converter being arranged to receive an electric power input from a DC power source at a first current level and supply electric power to the high-voltage electric power bus at a second current level.

Another aspect of the disclosure may include the DC-DC boost converter being couplable to a DC power source via the electrical connector.

Another aspect of the disclosure may include the DC power source being one of a fuel cell, an ultracapacitor, or a high-voltage DC battery.

Another aspect of the disclosure may include an electric charging system for an electrified vehicle that may include a DC-DC boost converter, an electrical connector including a positive cable and a negative cable, high-voltage electric power bus, and a high-voltage diode. The DC-DC boost converter is electrically connected to a rechargeable energy storage device via the high-voltage electric power bus. The electrical connector is electrically connected to the DC-DC boost converter via the positive cable and the negative cable. The high-voltage diode is arranged in the negative cable between the electrical connector and the DC-DC boost converter.

Another aspect of the disclosure may include a method for isolating a fault in an electrified vehicle during a charging event that includes installing a high-voltage diode in a negative cable between an electrical connector and a DC-DC boost converter, wherein the DC-DC boost converter is electrically connected to a rechargeable energy storage device via a high-voltage electric power bus; and wherein the electrical connector is electrically connected to the DC-DC boost converter via a positive cable and the negative cable.

Another aspect of the disclosure may include the high-voltage diode having a cathode and an anode, and installing the high-voltage diode in the negative cable between the electrical connector and the DC-DC boost converter includes installing the high-voltage diode with the anode proximal to the DC-DC boost converter, and with the cathode proximal to the electrical connector.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawing, in which:

The FIGURE schematically illustrates a multi-phase interleaved DC-DC boost converter that is arranged to conduct electric power from a DC power source to a high-voltage electrical bus, in accordance with the disclosure.

The appended drawing is not necessarily to scale, and presents a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

The FIGURE, consistent with embodiments disclosed herein, schematically illustrates a portion of an electrified vehicle 100 including an on-vehicle rechargeable energy storage system (RESS) 20 and an off-board DC fast charger 70. The electrified vehicle 100 employs the off-board DC fast charger 70 to electrically charge the RESS 20 via a DC-DC boost converter 90. The DC-DC boost converter 90 is arranged to conduct electric power from an off-vehicle DC power source 10 via the DC fast charger 70 to electrically charge the RESS 20 via an -high-voltage electrical bus 25. In one embodiment, the DC-DC boost converter 90 is a multi-phase interleaved DC-DC boost converter 90. The electrified vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. In addition, the concepts described herein may be applied to a system in which an embodiment of the DC power source 10 and DC-DC boost converter 90 are arranged to supply electrical power to one or more stationary electric machines, such as a generator.

The concepts described herein mitigate effects of an isolation fault on a high-voltage bus 25 that may occur during DC fast charging of an embodiment of the electrified vehicle 100 that employs an embodiment of the DC-DC boost converter 90. Given the higher voltage level of the battery pack compared to the output voltage of the DC fast charger, occurrence of an isolation fault between the high voltage connection of the RESS 20 and the chassis of the electrified vehicle 100 may result in electric current flow in the protective earth connection, which may damage a surge arrestor of the DC fast charger 70, and returning to the negative pole of the RESS 20.

A self-activating fault protection circuit 80 is arranged on-vehicle to provide vehicle isolation fault protection and eliminate occurrence of an on-vehicle isolation fault, thus reducing reaction time that would occur with a system that employs active sensing and gate driving circuitry for the fault isolation mechanism.

The DC power source 10 supplies DC electric power at a first voltage level (V1) via connector 15 to an input bus 13 that includes a positive input bus link (HV1+) 11 and a negative input bus link (HV1−) or negative cable 12. The DC-DC boost converter 90 converts the supplied DC electric power to electric power having a second voltage level (V2), which is supplied to the high-voltage electrical bus 20 via a high-voltage bus 25 that includes a positive output bus link (HV2+) 21 and a negative output bus link (HV2−) 22. The second voltage level (V2) is greater than the first voltage level (V1) in one embodiment. In one embodiment, and as shown the negative input bus link (HV1−) 12 and the negative output bus link (HV2−) 22 are electrically connected.

The self-activating fault protection circuit 80 includes a high-voltage diode 81 is arranged on-vehicle in the negative cable 12 between the electrical connector and the DC-DC boost converter 90. The high-voltage diode 81 includes a cathode 82 and an anode 84, wherein the anode 84 is proximal to the DC-DC boost converter 90, and wherein the cathode 82 is proximal to the electrical connector 15. The high-voltage diode 81 is forward-biased during charging mode of operation, and it is reversed-biased in the presence of an isolation fault, resulting in interruption of an isolation fault current. In one embodiment, the high-voltage diode 81 permits a forward current of 150A or greater, and has a blocking voltage that is greater than 800 Vdc.

In one embodiment, the DC power source 10 is an off-vehicle, externally-located DC power source 10.

In one embodiment, the DC-DC boost converter 90 includes a plurality of interleaved switched inductance circuits 30, a bulk capacitor 38, and software drivers and corresponding controller hardware that are disposed in an HWIO ("hardware input/output") that includes a gate driver circuit 50 and an electrical interface and software processing circuit 55. The HWIO includes a low-level interface and software. The plurality of interleaved switched inductance circuits 30 include, in one embodiment, a first switched inductance circuit 31, a second switched inductance circuit 32, and a third switched inductance circuit 33. Each of the first, second and third switched inductance circuits 31, 32, and 33 includes an inductor 34, a diode 35 and a power semiconductor switch 36, including one of the inductors 34 being electrically connected to a node 37 that electrically connects one of the diodes 35 and one of the power switches 36. The respective inductor 34 is arranged between HV1+ 11 and the node 37, and the respective diode 35 is arranged in series with the respective power switch 36 between HV2+ 21 and HV2− 22. One of the inductors 34 is arranged between HV1+ and the junction of the respective diode 35 in series with the respective power switch 36. Current sensors 41, 42, 43 are arranged to monitor phase currents passing through the respective node 37 of the respective first, second and third switched inductance circuits 31, 32, and 33. The DC-DC boost converter 90 is operated at a fixed frequency with a preset cycle time, and the first, second and third switched inductance circuits 31, 32, and 33 are operated with offsets in phase during each cycle period. The configuration of the inductor 34, diode 35 and controlled activation and deactivation of the power switch 36 facilitates generating an output voltage that is greater than the input voltage, with output current being less than the input current due to power balancing. As such, the DC-DC boost converter 90 is a multi-phase interleaved DC-DC electric power converter that is configured to boost or increase, i.e., step up a voltage level of electric power supplied from the off-board DC power source 10 that is connected via high-voltage bus 13.

A controller 60 is arranged to monitor signal inputs from the plurality of current sensors 41, 42, 43 and command operation of the power switches 36 of the first, second and third switched inductance circuits 31, 32, and 33. The power switches 36 may include a semiconductor device such as a metal oxide semiconductor field-effect transistor (MOS-FET), installed gate, bipolar transistor (IGBT), gate turn-off thyristor (GTO), or another electronic switching device, and are controllable in conducting modes (ON) and blocking modes (OFF). The DC-DC boost converter 90 as illustrated is configured as a three-phase device that employs three of the switched inductance circuits 30. However, it is appreciated that another quantity of the switched inductance circuits 30 may be employed, including, e.g., two, four, or more of the switched inductance circuits 30. Design aspects of the aforementioned inductors 34, diodes 35, power switches 36, etc., are application-specific, and depend upon factors such as power demand, current flow, operating environment, etc.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The self-activating fault protection circuit 80 described herein functions to mitigate, interrupt, and isolate a fault in the electrified vehicle during a charging event without the use of added isolation fault detection circuitry, thus potentially minimizing the reaction time of the isolation fault protection system and associated risks.

The detailed description and the drawings or FIGURES are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system for electrically charging a rechargeable energy storage device, comprising:
    a DC-DC boost converter, an electrical connector including a positive cable and a negative cable, a high-voltage electric power bus, and a self-activating fault protection circuit including a high-voltage diode;
    wherein the DC-DC boost converter is electrically connected to the rechargeable energy storage device via the high-voltage electric power bus;
    wherein the electrical connector is electrically connected to the DC-DC boost converter via the positive cable and the negative cable; and
    wherein the high-voltage diode is arranged in the negative cable between the electrical connector and the DC-DC boost converter and the high-voltage diode includes a cathode and an anode, wherein the anode is proximal to the DC-DC boost converter and wherein the cathode is proximal to the electrical connector.

2. The system of claim 1, wherein the DC-DC boost converter comprises:
    a plurality of switched inductance circuits arranged in parallel;
    a plurality of current sensors disposed to monitor one of the switched inductance circuits; and
    a controller, in communication with the current sensors and operatively connected to the switched inductance circuits.

3. The system of claim 1, wherein the DC-DC boost converter comprises a fixed-frequency DC-DC boost converter.

4. The system of claim 1, wherein the DC-DC boost converter comprises a multi-phase interleaved DC-DC boost converter configured to increase a voltage level of electric power supplied from a DC power source that is connected via high-voltage bus.

5. The system of claim 4, wherein the multi-phase interleaved DC-DC boost converter comprises a plurality of switched inductance circuits.

6. The system of claim 1, wherein the DC-DC boost converter is arranged to receive an electric power input from a DC power source at a first current level and supply electric power to the high-voltage electric power bus at a second current level.

7. The system of claim 1, wherein the DC-DC boost converter is couplable to a DC power source via the electrical connector.

8. The system of claim 7, wherein the DC power source comprises one of a fuel cell, an ultracapacitor, or a high-voltage DC battery.

9. An electric charging system for an electrified vehicle, comprising:
    a DC-DC boost converter, an electrical connector including a positive cable and a negative cable, a high-voltage electric power bus, and a high-voltage diode;
    wherein the DC-DC boost converter is electrically connected to a rechargeable energy storage device via the high-voltage electric power bus;

wherein the electrical connector is electrically connected to the DC-DC boost converter via the positive cable and the negative cable; and wherein the high-voltage diode is arranged in the negative cable between the electrical connector and the DC-DC boost converter and the high-voltage diode includes a cathode and an anode, wherein the anode is proximal to the DC-DC boost converter, and wherein the cathode is proximal to the electrical connector.

10. The electric charging system of claim 9, wherein the DC-DC boost converter comprises:
   a plurality of switched inductance circuits arranged in parallel;
   a plurality of current sensors disposed to monitor one of the switched inductance circuits; and
   a controller, in communication with the current sensors and operatively connected to the switched inductance circuits.

11. The electric charging system of claim 9, wherein the DC-DC boost converter comprises a fixed-frequency DC-DC boost converter.

12. The electric charging system of claim 9, wherein the DC-DC boost converter comprises a multi-phase interleaved DC-DC boost converter configured to increase a voltage level of electric power supplied from a DC power source that is connected via high-voltage bus.

13. The electric charging system of claim 12, wherein the multi-phase interleaved DC-DC boost converter comprises a plurality of switched inductance circuits.

14. The electric charging system of claim 9, wherein the DC-DC boost converter is arranged to receive an electric power input from a DC power source at a first current level and supply electric power to the high-voltage electric power bus at a second current level.

15. The electric charging system of claim 9, wherein the DC-DC boost converter is couplable to a DC power source via the electrical connector.

16. The electric charging system of claim 15, wherein the DC power source comprises one of a fuel cell, an ultracapacitor, or a high-voltage DC battery.

17. A method for isolating a fault in an electrified vehicle during a charging event, the method comprising:
   installing a high-voltage diode in a negative cable between an electrical connector and a DC-DC boost converter;
   wherein the DC-DC boost converter is electrically connected to a rechargeable energy storage device via a high-voltage electric power bus; and
   wherein the electrical connector is electrically connected to the DC-DC boost converter via a positive cable and the negative cable, and
   wherein the high-voltage diode includes a cathode and an anode, and wherein installing the high-voltage diode in the negative cable between the electrical connector and the DC-DC boost converter comprises installing the high-voltage diode with the anode proximal to the DC-DC boost converter, and with the cathode proximal to the electrical connector.

18. The method of claim 17, wherein the DC-DC boost converter comprises:
   a plurality of switched inductance circuits arranged in parallel;
   a plurality of current sensors disposed to monitor one of the switched inductance circuits; and
   a controller, in communication with the current sensors and operatively connected to the switched inductance circuits.

19. The method of claim 17, wherein the DC-DC boost converter comprises a fixed-frequency DC-DC boost converter.

20. The method of claim 17, wherein the DC-DC boost converter comprises a multi-phase interleaved DC-DC boost converter configured to increase a voltage level of electric power supplied from a DC power source that is connected via high-voltage bus.

* * * * *